(12) United States Patent
Wiese et al.

(10) Patent No.: US 8,605,837 B2
(45) Date of Patent: Dec. 10, 2013

(54) ADAPTIVE FREQUENCY-DOMAIN REFERENCE NOISE CANCELLER FOR MULTICARRIER COMMUNICATIONS SYSTEMS

(75) Inventors: Brian R. Wiese, San Francisco, CA (US); Philip Desjardins, Nevada City, CA (US); Jayasuryan Iyer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1152 days.

(21) Appl. No.: 12/287,577

(22) Filed: Oct. 10, 2008

(65) Prior Publication Data

US 2010/0091827 A1   Apr. 15, 2010

(51) Int. Cl.
*H03D 1/04*     (2006.01)
*H03D 1/06*     (2006.01)
*H03K 5/01*     (2006.01)
*H03K 6/04*     (2006.01)
*H04B 1/10*     (2006.01)
*H04L 1/00*     (2006.01)
*H04L 25/08*    (2006.01)

(52) U.S. Cl.
USPC ........... 375/346; 375/260; 375/343; 375/148; 375/232; 375/261; 455/501; 455/63.1; 455/114.2; 455/296

(58) Field of Classification Search
USPC ......... 375/346, 148, 231, 232, 284, 285, 261, 375/264, 260, 343; 455/501, 63.1, 114.2, 455/296
See application file for complete search history.

(56) References Cited

U.S. PATENT DOCUMENTS

| | | |
|---|---|---|
| 4,009,371 A | 2/1977 | Hamilton et al. |
| 4,024,359 A | 5/1977 | DeMarco et al. |
| 4,024,360 A | 5/1977 | Biraghi et al. |
| 4,173,714 A | 11/1979 | Bloch et al. |
| 4,384,355 A | 5/1983 | Werner |
| 4,679,227 A | 7/1987 | Hughes-Hartogs |
| 4,733,389 A | 3/1988 | Puvogel |
| 4,845,466 A | 7/1989 | Hariton et al. |
| 4,882,733 A | 11/1989 | Tanner |
| 4,977,591 A | 12/1990 | Chen et al. |
| 5,285,474 A | 2/1994 | Chow et al. |

(Continued)

FOREIGN PATENT DOCUMENTS

| EP | 0 377 965 A2 | 7/1989 |
|---|---|---|
| EP | 0 844 758 A2 | 5/1998 |

(Continued)

OTHER PUBLICATIONS

Magesacher, Thomas et al., "Information Rate Bounds in Common-Mode Aided Wireline Communications," European Transactions on Telecommunications, vol. 17, No. 5, Oct. 2006, pp. 533-545.

(Continued)

*Primary Examiner* — Phuong Phu
(74) *Attorney, Agent, or Firm* — Sterne, Kessler, Goldstein & Fox PLLC

(57) ABSTRACT

A method and apparatus to align data blocks in a data signal and a reference signal to increase cross-correlation between the data signal and the reference signal as compared to the unaligned data and reference signals and cancel interference in the data signal in the frequency-domain under changing conditions and in the presence of the data signal.

37 Claims, 8 Drawing Sheets

(56) References Cited

U.S. PATENT DOCUMENTS

| | | |
|---|---|---|
| 5,304,940 A | 4/1994 | Harasawa et al. |
| 5,479,447 A | 12/1995 | Chow et al. |
| 5,483,551 A | 1/1996 | Huang et al. |
| 5,524,125 A | 6/1996 | Tsujimoto |
| 5,555,274 A | 9/1996 | Sheets |
| 5,559,890 A | 9/1996 | Obermeier et al. |
| 5,596,258 A | 1/1997 | Kimura et al. |
| 5,596,439 A | 1/1997 | Dankberg et al. |
| 5,627,859 A | 5/1997 | Parr |
| 5,703,904 A | 12/1997 | Langberg |
| 5,768,473 A | 6/1998 | Eatwell et al. |
| 5,790,550 A | 8/1998 | Peeters et al. |
| 5,815,538 A | 9/1998 | Grell et al. |
| 5,818,872 A | 10/1998 | Gupta |
| 5,844,940 A | 12/1998 | Goodson et al. |
| 5,852,630 A | 12/1998 | Langberg et al. |
| 5,867,539 A | 2/1999 | Koslov |
| 5,901,205 A | 5/1999 | Smith et al. |
| 5,909,178 A | 6/1999 | Balch et al. |
| 5,930,268 A | 7/1999 | Kurby et al. |
| 5,952,914 A | 9/1999 | Wynn |
| 5,974,098 A | 10/1999 | Tsuda |
| 5,978,373 A | 11/1999 | Hoff et al. |
| 5,978,760 A | 11/1999 | Rao et al. |
| 6,006,083 A | 12/1999 | Tong et al. |
| 6,014,376 A | 1/2000 | Abreu et al. |
| 6,052,420 A | 4/2000 | Yeap et al. |
| 6,118,769 A | 9/2000 | Pries et al. |
| 6,147,963 A | 11/2000 | Walker et al. |
| 6,161,209 A | 12/2000 | Moher |
| 6,185,429 B1 | 2/2001 | Gehrke et al. |
| 6,205,220 B1 | 3/2001 | Jacobsen et al. |
| 6,205,410 B1 | 3/2001 | Cai |
| 6,212,227 B1 | 4/2001 | Ko et al. |
| 6,226,322 B1 | 5/2001 | Mukherjee |
| 6,256,326 B1 | 7/2001 | Kudo |
| 6,266,347 B1 | 7/2001 | Amrany et al. |
| 6,266,422 B1 | 7/2001 | Ikeda |
| 6,295,323 B1 | 9/2001 | Gabara |
| 6,330,275 B1 | 12/2001 | Bremer |
| 6,345,071 B1 | 2/2002 | Hamdi |
| 6,351,509 B1 | 2/2002 | Vitenberg et al. |
| 6,359,926 B1 | 3/2002 | Isaksson |
| 6,363,109 B1 | 3/2002 | Polley et al. |
| 6,378,234 B1 | 4/2002 | Luo |
| 6,396,827 B1 | 5/2002 | Paivike et al. |
| 6,411,657 B1 | 6/2002 | Verbin et al. |
| 6,433,819 B1 | 8/2002 | Li et al. |
| 6,445,773 B1 | 9/2002 | Liang et al. |
| 6,456,673 B1 | 9/2002 | Wiese et al. |
| 6,459,739 B1 | 10/2002 | Vitenberg |
| 6,466,588 B1 | 10/2002 | Michaels |
| 6,493,395 B1 | 12/2002 | Isaksson et al. |
| 6,498,808 B1 | 12/2002 | Tzannes |
| 6,507,608 B1 | 1/2003 | Norrell |
| 6,519,291 B1 | 2/2003 | Dagdeviren et al. |
| 6,542,028 B1 | 4/2003 | Norrell et al. |
| 6,546,025 B1 | 4/2003 | Dupuy |
| 6,556,635 B1 | 4/2003 | Dehghan |
| 6,597,732 B1 | 7/2003 | Dowling |
| 6,621,346 B1 | 9/2003 | Nabicht et al. |
| 6,631,175 B2 | 10/2003 | Harikumar et al. |
| 6,633,545 B1 | 10/2003 | Milbrandt |
| 6,647,070 B1 | 11/2003 | Shalvi et al. |
| 6,674,795 B1 | 1/2004 | Liu et al. |
| 6,690,666 B1 | 2/2004 | Norrell et al. |
| 6,721,394 B1 | 4/2004 | Murphy et al. |
| 6,731,914 B2 | 5/2004 | Creigh et al. |
| 6,738,418 B1 | 5/2004 | Stiscia et al. |
| 6,754,170 B1 | 6/2004 | Ward |
| 6,763,061 B1 * | 7/2004 | Strait et al. ............ 375/219 |
| 6,775,241 B1 | 8/2004 | Levin |
| 6,791,995 B1 | 9/2004 | Azenkot et al. |
| 6,798,735 B1 | 9/2004 | Tzannes et al. |
| 6,822,998 B1 | 11/2004 | Yun et al. |
| 6,826,404 B2 | 11/2004 | Delfs et al. |
| 6,839,429 B1 | 1/2005 | Gaikwad et al. |
| 6,859,488 B2 | 2/2005 | Azenkot et al. |
| 6,871,066 B1 | 3/2005 | Khullar et al. |
| 6,888,497 B2 | 5/2005 | King et al. |
| 6,898,236 B1 | 5/2005 | Sun |
| 6,934,345 B2 * | 8/2005 | Chu et al. ............ 375/346 |
| 6,940,973 B1 | 9/2005 | Yeap et al. |
| 6,965,636 B1 | 11/2005 | DesJardins et al. |
| 6,999,504 B1 | 2/2006 | Amrany et al. |
| 6,999,507 B2 | 2/2006 | Jin |
| 7,023,910 B1 | 4/2006 | Norrell |
| 7,031,669 B2 | 4/2006 | Vaidyanathan et al. |
| 7,035,661 B1 | 4/2006 | Yun |
| 7,085,315 B1 | 8/2006 | Kelton |
| 7,085,539 B2 | 8/2006 | Furman |
| 7,120,211 B2 | 10/2006 | Shmulyian et al. |
| 7,155,007 B1 | 12/2006 | Upton |
| 7,174,022 B1 | 2/2007 | Zhang et al. |
| 7,177,419 B2 | 2/2007 | Sedarat et al. |
| 7,184,467 B2 | 2/2007 | Jacobsen et al. |
| 7,200,196 B2 | 4/2007 | Li et al. |
| 7,215,727 B2 | 5/2007 | Yousef et al. |
| 7,221,722 B2 | 5/2007 | Thomas et al. |
| 7,240,252 B1 | 7/2007 | Fessler et al. |
| 7,260,117 B2 | 8/2007 | Long et al. |
| 7,283,509 B2 | 10/2007 | Moon et al. |
| 7,283,598 B2 | 10/2007 | Akita et al. |
| 7,302,379 B2 | 11/2007 | Cioffi et al. |
| 7,315,592 B2 | 1/2008 | Tsatsanis et al. |
| 7,315,967 B2 | 1/2008 | Azenko et al. |
| 7,330,544 B2 | 2/2008 | D'Angelo et al. |
| 7,356,049 B1 | 4/2008 | Rezvani |
| 7,366,258 B2 | 4/2008 | Kolze et al. |
| 7,369,607 B2 | 5/2008 | Sedarat |
| 7,421,015 B2 | 9/2008 | Sedarat |
| 7,433,395 B2 | 10/2008 | Sedarat |
| 7,443,916 B2 | 10/2008 | Sedarat et al. |
| 7,502,336 B2 | 3/2009 | Romano et al. |
| 7,529,984 B2 | 5/2009 | Heise |
| 7,555,037 B2 | 6/2009 | Sedarat |
| 7,630,489 B2 | 12/2009 | Oksman et al. |
| 7,773,666 B2 | 8/2010 | Belge et al. |
| 7,813,439 B2 | 10/2010 | Norrell et al. |
| 7,822,005 B2 | 10/2010 | Ptasinski et al. |
| 7,852,950 B2 | 12/2010 | Sedarat |
| 7,953,163 B2 | 5/2011 | Wiese |
| 8,194,722 B2 | 6/2012 | Norrell |
| 2001/0009850 A1 | 7/2001 | Kushige |
| 2001/0011019 A1 | 8/2001 | Jokimies |
| 2001/0055332 A1 | 12/2001 | Sadjadpour et al. |
| 2002/0001340 A1 | 1/2002 | Shenoi et al. |
| 2002/0044597 A1 | 4/2002 | Shively et al. |
| 2002/0057713 A1 | 5/2002 | Bagchi et al. |
| 2002/0078247 A1 | 6/2002 | Lu et al. |
| 2002/0080862 A1 * | 6/2002 | Ali ............ 375/148 |
| 2002/0122515 A1 | 9/2002 | Bodenschatz |
| 2002/0154620 A1 | 10/2002 | Azenkot et al. |
| 2002/0163959 A1 | 11/2002 | Haddad |
| 2003/0021240 A1 | 1/2003 | Moon et al. |
| 2003/0035469 A1 | 2/2003 | Frank et al. |
| 2003/0043925 A1 | 3/2003 | Stopler et al. |
| 2003/0048368 A1 | 3/2003 | Bosco et al. |
| 2003/0055996 A1 | 3/2003 | Mori et al. |
| 2003/0091053 A1 | 5/2003 | Tzannes et al. |
| 2003/0099285 A1 | 5/2003 | Graziano et al. |
| 2003/0099286 A1 | 5/2003 | Graziano et al. |
| 2003/0099350 A1 | 5/2003 | Bostoen et al. |
| 2003/0108094 A1 | 6/2003 | Lai et al. |
| 2003/0112860 A1 | 6/2003 | Erdogan |
| 2003/0112887 A1 | 6/2003 | Sang et al. |
| 2003/0124983 A1 | 7/2003 | Parssinen et al. |
| 2003/0185176 A1 | 10/2003 | Lusky et al. |
| 2003/0206579 A1 | 11/2003 | Bryant |
| 2003/0227967 A1 | 12/2003 | Wang et al. |
| 2004/0057502 A1 | 3/2004 | Azenkot et al. |
| 2004/0066865 A1 | 4/2004 | Yousef et al. |
| 2004/0071240 A1 | 4/2004 | Betts |
| 2004/0085987 A1 | 5/2004 | Gross et al. |

(56) References Cited

U.S. PATENT DOCUMENTS

| | | |
|---|---|---|
| 2004/0087278 A1 | 5/2004 | Lin et al. |
| 2004/0091025 A1 | 5/2004 | Sindhushayana et al. |
| 2004/0111345 A1 | 6/2004 | Chuang et al. |
| 2004/0125015 A1 | 7/2004 | King et al. |
| 2004/0141548 A1 | 7/2004 | Shattil |
| 2004/0156441 A1 | 8/2004 | Peeters et al. |
| 2004/0176063 A1 | 9/2004 | Choi |
| 2004/0185852 A1 | 9/2004 | Son et al. |
| 2004/0213170 A1 | 10/2004 | Bremer |
| 2004/0223449 A1 | 11/2004 | Tsuie et al. |
| 2005/0041753 A1 | 2/2005 | Cunningham |
| 2005/0047489 A1 | 3/2005 | Yousef et al. |
| 2005/0047514 A1 | 3/2005 | Bolinth et al. |
| 2005/0053229 A1 | 3/2005 | Tsatsanis et al. |
| 2005/0094550 A1 | 5/2005 | Huh et al. |
| 2005/0099967 A1 | 5/2005 | Baba |
| 2005/0111561 A1 | 5/2005 | Sedarat et al. |
| 2005/0143008 A1 | 6/2005 | Bailey |
| 2005/0159128 A1 | 7/2005 | Collins et al. |
| 2005/0169357 A1 | 8/2005 | Sedarat |
| 2005/0190825 A1 | 9/2005 | Sedarat |
| 2005/0190848 A1 | 9/2005 | Kiyanagii et al. |
| 2005/0190871 A1 | 9/2005 | Sedarat |
| 2005/0216441 A1 | 9/2005 | Thomas et al. |
| 2005/0271129 A1 | 12/2005 | Reina |
| 2005/0276355 A1 | 12/2005 | Chow et al. |
| 2006/0002457 A1 | 1/2006 | Romano et al. |
| 2006/0019687 A1 | 1/2006 | Garg et al. |
| 2006/0039550 A1 | 2/2006 | Chadha et al. |
| 2006/0056305 A1 | 3/2006 | Oksman et al. |
| 2006/0062379 A1 | 3/2006 | Sedarat et al. |
| 2006/0067388 A1 | 3/2006 | Sedarat et al. |
| 2006/0078044 A1 | 4/2006 | Norrell et al. |
| 2006/0083321 A1 | 4/2006 | Sedarat |
| 2006/0083322 A1 | 4/2006 | DesJardins et al. |
| 2006/0083323 A1 | 4/2006 | DesJardins et al. |
| 2006/0083324 A1 | 4/2006 | DesJardins et al. |
| 2006/0115030 A1 | 6/2006 | Erving et al. |
| 2006/0126747 A1 | 6/2006 | Wiese |
| 2006/0171480 A1 | 8/2006 | Erving et al. |
| 2006/0193390 A1 | 8/2006 | Sedarat |
| 2006/0203843 A1 | 9/2006 | Liu |
| 2006/0222098 A1 | 10/2006 | Sedarat et al. |
| 2006/0227913 A1 | 10/2006 | Sedarat |
| 2006/0253515 A1 | 11/2006 | Sedarat |
| 2006/0291537 A1 | 12/2006 | Fullerton et al. |
| 2007/0002940 A1 | 1/2007 | Zhou |
| 2007/0183526 A1 | 8/2007 | Norrell et al. |
| 2007/0217492 A1 | 9/2007 | Cox et al. |
| 2008/0232444 A1 | 9/2008 | Tzannes |
| 2008/0317110 A1 | 12/2008 | Sedarat |
| 2011/0206104 A1 | 8/2011 | Wiese et al. |

FOREIGN PATENT DOCUMENTS

| | | |
|---|---|---|
| EP | 0 966 134 A2 | 12/1999 |
| EP | 1 389 846 A2 | 2/2004 |
| EP | 1 388 944 A1 | 4/2004 |
| WO | WO 2006/042274 A1 | 4/2006 |
| WO | WO 2010/042350 | 4/2010 |

OTHER PUBLICATIONS

Cioffi, J. et al., "Analog RF Cancelation with SDMT (96-084)" T1E1. 4/96-084 contribution, Amati Communications Corporation, Apr. 22, 1996, 10 pages.

Magesacher, Thomas et al., "Analysis of Adaptive Interference Cancellation Using Common-Mode Information in Wireline Communications," EURSASIO Journal on Advances in Signal Processing, vol. 2007, Article ID 84956, 11 pages.

Magesacher, Thomas et al., "Adaptive Interference Cancellation Using Common-Mode Information in DSL," European Signal Processing Conference 2005, Proceedings of, Antalya, Turkey, Sep. 2005, 4 pages.

Ahmed, Nadeem, et al., "Optimal Transmit Spectra for Communication in the Presence of Crosstalk and Imperfect Echo Cancellation," IEEE, p. 17-21, © 2001.

Al-Dhahir, Naofal, et al., "Optimum Finite-Length Equalization for Multicarrier Transceivers," IEEE vol. 44, No. 1, p. 56-64, Jan. 1996.

Armada, Ana Garcia, et al., "Mulit-User Constant-Energy Bit Loading for M-PSK-Modulated Orthogonal Frequency Division Multiplexing," IEEE, p. 526-530, © 2002.

Arslan, G., et al., "Equalization for Discrete Multitone Transceivers to Maximize Bit Rate," IEEE, vol. 49, No. 12, p. 3123-3135, Dec. 2001.

Baccarelli, Enzo, et al., Novel Efficient Bit-Loading Algorithms for Peak-Energy Limited ADSL-Type Multicarrier Systems, IEEE Trans on Signal Processing, vol. 50, No. 5, May 2002.

Barreto, Andre Noll, et al., "Adaptive Bit Loading for Wireless OFDM Systems," IEEE International Symposium on Personal, Indoor, and Mobile Radio Communications, Oct. 2001.

Bingham, John A.C., et al., "Multicarrier Modulation for Data Transmission: An Idea Whose Time Has Come," IEEE, p. 5-14, May 1990.

Blahut, Richard E., "Theory and Practice of Error Control Codes," Chapter 7: Bose-Chaudhuri-Hocquenghem Codes, 1984.

Blahut, Richard E., "Theory and Practice of Error Control Codes," Chapter 11: Fast Algorithms, 1984.

Campello, Jorge, "Optimal Discrete Bit Loading for Multicarrier Modulation Systems," IEEE International Symposium on Information Theory, Cambridge, MA, Aug. 1998.

Chow, Peter S., et al., "A Practical Discrete Multitone Transceiver Loading Algorithm for Data Transmission Over Spectrally Shaped Channels," IEEE Trans. On Communications, vol. 43, No. 2, 1995.

Cioffi, J.M. et al., "Generalized Decision-Feedback Equalization for Packet Transmission with ISI and Gaussian Noise," In Communications, Computation, Control, and Signal Processing, a tribute to Thomas Kailath, Kluwer Academic Publishers, p. 79-127, 1997.

Communication pursuant to Article 94(3), EPC, 05806662.2-1525, Ref. W3477002EPPWOSv, dated Feb. 26, 2008.

Communication pursuant to Rules 109 and 110 EPC, 05806662.2-1525, PCT/US2005/036655, W3477002EPPWOSv, 2 pages, dated May 21, 2007.

"Draft Standard," Network and Customer Installation Interfaces—Asymmetric Digital Subscriber Line (ADSL) Metallic Interface, Draft American National Standard for Telecommunications, Alliance for Telecommunications Industry Solutions, T1. 413, 1998.

Farhang-Boroujeny, Behrouz, et al., "Design Methods for Time-Domain Equalizers in DMT Transceivers," IEEE, vol. 49, No. 3, p. 554-562, Mar. 2001.

Fischer, Robert F.H., et al., "A New Loading Algorithm for Discrete Multitone Transmission," IEEE, p. 724-728, 1996.

Franklin, Curt, "How DSL Works," How Stuff Works, http://computer.howstuffworks.com/dsl.htm/printable, printed Nov. 16, 2004.

Henkel, Werner, et al., "Maximizing the Channel Capacity of Multicarrier Transmission by Suitable Adaptation of the Time-Domain Equalizer," IEEE, vol. 48, No. 12, Dec. 2000.

International Preliminary Report on Patentability, PCT/US2005/023634 filed Jun. 30, 2005, mailed Jan. 18, 2007.

International Preliminary Report on Patentability (Chapter 1), International Application No. PCT/US2005/036655, filed Oct. 11, 2005, mailed Apr. 11, 2007.

International Preliminary Report on Patentability, International Application No. PCT/US2007/001997, filed Jan. 25, 2007, mailed Aug. 21, 2008.

International Telecommunication Union (ITU) Recommendation G.992.1, "Asymmetric digital subscriber line (ADSL) transceivers," Series G: Transmission Systems and Media, Digital Systems and Networks, Jun. 1999.

International Telecommunication Union (ITU) Recommendation G.992.3, "Asymmetric digital subscriber line transceivers -2 (ASDL 2), Series G: Transmission Systems and Media, Digital Systems and Networks," Jul. 2002.

International Telecommunication Union (ITU) Recommendation G.993.1, "Very high speed digital subscriber line (VDSL)," Series G: Transmission Systems and Media, Digital Systems and Networks, Jun. 2004.

(56) References Cited

OTHER PUBLICATIONS

International Telecommunication Union (ITU) Recommendation G.992.2, "Splitterless asymmetric digital subscriber line (ADSL) transceivers," Series G: Transmission Systems and Media, Digital Systems and Networks, Jun. 1999.
Kamkar-Parsi et al., Wideband Crosstalk Interface Cancelling on xDSL Using Adaptive Signal Processing and Common Mode Signal, IEEE, p. IV-1045-IV-1048, 2004.
Karp et al., Zero-forcing frequency domain equalization for DMT systems with insufficient guard interval, IEEE ICASSP, p. 221-224, 2003.
Krongold, Brian S., et al., "Computationally Efficient Optimal Power Allocation Algorithms for Multicarrier Communications Systems," IEEE Trans. On Communications, vol. 48, p. 23-27, Jan. 2000.
Lampe, Lutz H.J., et al., "Performance Evaluation of Non-Coherent Transmission Over Power Lines," 8 pages, 2007.
Lashkarian, Navid, et al., Fast Algorithm for Finite-Length MMSE Equalizers with Application to Discrete Multitone Systems, IEEE, p. 2753-2756, 1999.
Leke, Achankeng et al., "A Maximum Rate Loading Algorithm for Discrete Multitone Modulation Systems," IEEE, p. 1514-1518, 1997.
Melsa, Peter J.W., et al., "Impulse Response Shortening for Discrete Multitone Transceivers," IEEE vol. 44, No. 12, p. 1662-1672, Dec. 1996.
Milosevic et al., "Simultaneous Multichannel Time Domain Equalizer Design Based on the Maximum Composite Shortening SNR," Dept. of Electrical and Compter Eng., The University of Texas, Austin, Texas, 5 pages, 2002.
Misao, Fukuda et all, "A Line Terminating LSI Using Echo Cancelling Method for ISDN Subscriber Loop Transmission," IEEE Journal on Selected Areas in Communications, vol. 6, No. 3, p. 476-483, Apr. 1988.
Okamura, Yasuka et al., "ADSL System for Time Periodic Noise Environments," XP-00086790, NEC Res. & Develop., vol. 40, No. 1, p. 64-69, Jan. 1999.
PCT Search Report and Written Opinion of the International Searching Authority, International Application No. PCT/US05/23634, International filing date Jun. 30, 2005, mailed May 4, 2006.
PCT Search Report and Written Opinion of the International Searching Authority, International Application No. PCT/US2005/036655, International filing date Oct. 11, 2005, mailed Feb. 14, 2006.
PCT Search Report and Written Opinion of the International Searching Authority, International Application No. PCT/US2007/001997, International filing date Jan. 25, 2007, mailed Jul. 18, 2007.
PCT Search Report and Written Opinion of the International Searching Authority, International Application No. PCT/US06/09687, International Filing Date Mar. 16, 2006, Mailed Nov. 16, 2007.
PCT Search Report and Written Opinion of the International Searching Authority, International Application No. PCT/US06/10004, International Filing Date Mar. 16, 2006, Mailed Oct. 10, 2007.
PCT Search Report and Written Opinion of the International Searching Authority, International Application No. PCT/US06/09804, Filing Date Mar. 17, 2006, Mailed Apr. 2, 2008.
PCT Search Report and Written Opinion of the International Searching Authority, International Application No. PCT/US09/58821, Filing Date Sep. 29, 2009, Mailed Dec. 2, 2009.
Perez-Alvarez, Ivan A., et al., "A Differential Error Reference Adaptive Echo Canceller for Multilevel PAM Line Codes," Work supported by National Project T1C95-0026, IEEE, p. 1707-1710, © 1996.
Sedarat, Hossein, et al., "Impulse Noise Protection for Multi-Carrier Communication Systems," submitted to IEEE ICASSP, 2005.
Sedarat, Hossein, et al., "Multicarrier Bit-Loading in Presence of Biased Gaussian Noise Sources," IEEE Consumer Communication and Networking Conference, Jan. 2005.
Sonalkar, Ranjan, et al., "An Efficient Bit-Loading Algorithm for DMT Application," IEEE Comm. Letters, vol. 4, p. 80-82, Mar. 2000.
Sonalkar, Ranjan, et al., "Shannon Capacity of Frequency-Overlapped Digital Subscriber Loop Channels," IEEE, p. 1741-1745, © 2002.
Starr, Thomas et al., "Understanding Digital Subscriber Line Technology," p. 94-97, 147-154, 206-217, 241-251, and 330-331, Prentice Hall PTR, Upper Saddle River, NJ, 1999.
STLC60134S: TOSCA Integrated ADSL. CMOS Analog Front-End Circuit, Aug. 1999.
Toumpakaris, D. "A byte-erasure method for improved impulse immunity in DSL systems using soft information from an inner code," IEEE International Conference on Communications (ICC), vol. 4, p. 2431-2435, May 2003.
Toumpakaris, D., "A Square Distance-Based Byte-Erasure Method for Reduced-delay Protection of DSL Systems from Non-stationary Interference," IEEE International Conference on Communications (ICC), vol. 4, p. 2114-2119, San Francisco, CA, Dec. 2003.
Toumpakaris, D., "Reduced Delay Protection of DSL Systems Against Nonstationary Disturbances," IEEE Trans. Communications, vol. 52, No. 11, Nov. 2004.
Wu, Cheng-Shing, et al., "A Novel Cost-Effective Multi-Path Adaptive Interpolated FIR (IFIR)-Based Echo Canceller," IEEE, p. V-453-V-456, © 2000.
Wyglinski, Alexander M., et al., "An Efficient Bit Allocation for Multicarrier Modulation," IEEE Wireless Communication, Networking Conference, Atlanta, GA, 4 pages, Mar. 2004.
Zogakis, T.N., et al., "Impulse Noise Mitigation Strategies for Multicarrier Modulation," Proceedings of the International Conference on Communications (ICC), vol. 3, p. 784-788, May 23, 1993.
Non-Final Office Action dated Oct. 30, 2007, U.S. Appl. No. 11/067,434, filed Feb. 25, 2005, Sedarat.
Final Office Action dated Apr. 29, 2008, U.S. Appl. No. 11/067,434, filed Feb. 25, 2005, Sedarat.
Non-Final Office Action dated Jul. 21, 2008, U.S. Appl. No. 11/067,434, filed Feb. 25, 2005, Sedarat.
Non-Final Office Action dated Jan. 6, 2009, U.S. Appl. No. 11/067,434, filed Feb. 25, 2005, Sedarat.
Non-Final Office Action dated Aug. 19, 2009, U.S. Appl. No. 11/067,434, filed Feb. 25, 2005, Sedarat.
Non-Final Office Action dated May 16, 2008, U.S. Appl. No. 11/131,392, filed May 16, 2005, Wiese.
Non-Final Office Action dated Dec. 10, 2008, U.S. Appl. No. 11/131,392, filed May 16, 2005, Wiese.
Non-Final Office Action dated Jun. 9, 2009, U.S. Appl. No. 11/131,392, filed May 16, 2005, Wiese.
Non-Final Office Action dated Aug. 21, 2008, U.S. Appl. No. 11/248,704, filed Oct. 11, 2005, Norrell et al.
Non-Final Office Action dated Feb. 4, 2009, U.S. Appl. No. 11/248,704, filed Oct. 11, 2005, Norrell et al.
Final Office Action dated Aug. 5, 2009, U.S. Appl. No. 11/248,704, filed Oct. 11, 2005, Norrell et al.
Non-Final Office Action dated Nov. 26, 2008, U.S. Appl. No. 11/348,733, filed Feb. 6, 2006, Norrell et al.
Non-Final Office Action dated Apr. 8, 2009, U.S. Appl. No. 11/348,733, filed Feb. 6, 2006, Norrell et al.
Non-Final Office Action dated Oct. 23, 2009, U.S. Appl. No. 11/348,733, filed Feb. 6, 2006, Norrell et al.
Non-Final Office Action dated Feb. 24, 2009, U.S. Appl. No. 11/377,114, filed Mar. 15, 2006, Sedarat.
Final Office Action dated Jul. 31, 2009, U.S. Appl. No. 11/377,114, filed Mar. 15, 2006, Sedarat.
Non-Final Office Action dated Nov. 9, 2007, U.S. Appl. No. 11/377,083, filed Mar. 15, 2006, Sedarat.
Non-Final Office Action dated May 19, 2008, U.S. Appl. No. 11/377,083, filed Mar. 15, 2006, Sedarat.
Notice of Allowance dated May 18, 2009, U.S. Appl. No. 11/377,083, filed Mar. 15, 2006, Sedarat.
Final Office Action dated Dec. 4, 2008, U.S. Appl. No. 11/377,083, filed Mar. 15, 2006, Sedarat.
Non-Final Office Action dated Dec. 11, 2008, U.S. Appl. No. 11/377,084, filed Mar. 15, 2006, Sedarat et al.
Non-Final Office Action dated Aug. 4, 2009, U.S. Appl. No. 11/377,084, filed Mar. 15, 2006, Sedarat et al.
PCT International Search Report and The Written Opinion of the International Searching Authority, PCT/US09/58821 filed Sep. 29, 2009, mailed Dec. 2, 2009, 14 pages.

(56) References Cited

OTHER PUBLICATIONS

Magesacher, T. et al., "On the Capacity of the Copper Cable Channel Using the Common Mode", *Proc. Of the Global Telecommunications Conference*, Taipei, Taiwan, Nov. 2002, 6 pages.

Yeap, T.H. et al., "Novel Common Mode Noise Cancellation Techniques for xDSL Applications", *Proc. Of IEEE Instrumentation and Measurement Technology Conference*, Anchorage, AK, May 2002, pp. 1125-1128.

Office Action, dated Jul. 29, 2010, for U.S. Appl. No. 11/131,392, filed May 16, 2010, 33 pages.

Office Action, dated Jun. 14, 2010, for U.S. Appl. No. 11/248,074, filed Oct. 11, 2005, 19 pages.

Final Office Action, dated Dec. 6, 2010, for U.S. Appl. No. 11/248,074, filed Oct. 11, 2005, 28 pages.

Office Action, dated Apr. 14, 2011, for U.S. Appl. No. 11/248,074, filed Oct. 11, 2005, 17 pages.

Office Action, dated Oct. 26, 2011, for U.S. Appl. No. 11/248,074, filed Oct. 11, 2005, 16 pages.

Office Action, dated Aug. 30, 2010, for U.S. Appl. No. 11/337,114, filed Mar. 15, 2006, 30 pages.

Final Office Action, dated Jan. 4, 2011, for U.S. Appl. No. 11/337,114, filed Mar. 15, 2006, 13 pages.

Office Action, dated Jul. 26, 2011, for U.S. Appl. No. 11/337,114, filed Mar. 15, 2006, 12 pages.

Final Office Action, dated Nov. 28, 2011, for U.S. Appl. No. 11/337,114, filed Mar. 15, 2006, 13 pages.

Final Office Action, dated Jul. 8, 2010, for U.S. Appl. No. 11/337,084, filed Mar. 15, 2006, 12 pages.

\* cited by examiner

ADAPTIVE FREQUENCY-DOMAIN REFERENCE NOISE CANCELLER FOR MULTICARRIER COMMUNICATIONS SYSTEMS

TECHNICAL FIELD

This invention relates generally to a multi-carrier communication system and, in particular, to noise cancellation in a multi-carrier communication system.

BACKGROUND

A multi-carrier communication system, such as a Discrete Multi-Tone (DMT) system in the various types of Digital Subscriber Line (DSL), for example, asymmetric digital subscriber line (ADSL) and very high-speed digital subscriber line (VDSL) systems, carries an information bit stream from a transmitter to a receiver. The information bit stream is typically converted into a sequence of data symbols having a number of tones. Each tone may be a group of one or more frequencies defined by a center frequency and a set bandwidth. The tones are also commonly referred to as sub-carriers or sub-channels. Each tone acts as a separate communication channel to carry information between a local transmitter-receiver (transceiver) device and a remote transceiver device.

FIG. 1 is a block diagram illustrating a conventional DMT receiver. A channel equalizer is used to control the spread of the data symbols after going through the channel. A cyclic prefix (CP) may be employed in such systems to simplify channel equalization to minimize a source of cross channel interference. Generally, if the length of the channel impulse response is equal to or less than the cyclic prefix length plus one sample, then channel equalization is trivial and perfect equalization can be achieved. The channel can be inverted in the frequency domain after a discrete Fourier transform (DFT) by a single complex multiply for each sub-channel. This is usually referred to as frequency-domain equalization (FEQ).

On transmission lines in DMT communication systems, such as ADSL or VDSL, the data signal is generally transmitted differentially. Interference such as radio-frequency interference (RFI), crosstalk and impulse noise electromagnetically couples into both the common mode and the differential mode of such transmission lines. In the case of a binder containing multiple transmission lines, such interference may couple into some or all of the transmission line in the binder and such noise may be correlated between lines.

Conventional techniques for reducing differential noise, thereby improving data rates over the DSL, include use of common-mode information. In a traditional DSL system, the common-mode voltage is measured, an estimate of the differential-mode interference is constructed and the interference estimate is subtracted from the desired signal.

Traditional cancellation may occur in the time-domain or the frequency domain. For example, frequency bands containing RFI are band-pass filtered and then subtracted from the differential-mode signal in the time domain. In the frequency domain, a small set of frequency bins are used to compute and remove an estimate of RFI on a larger number of data carrying frequency bins. Other conventional systems cancel crosstalk in both the time domain and the frequency domain by solving a specific set of equations.

However, there are significant drawbacks associated with filtering and subtracting an interference estimate in the time-domain. For example, training and updating the noise estimation unit is difficult, especially in the presence of a data signal. Furthermore, time-domain subtraction tends to result in noise enhancement. A reduction in the power spectral density (PSD) of the interference may be achieved over parts of the frequency band where the interference is strongest, but interference PSD enhancement may occur in other frequency regions, resulting in sub-optimal system performance.

Known frequency-domain techniques also have significant limitations. Common-mode interference may not be limited to crosstalk or RFI alone, but may be a combination of the two. There may also be wideband noise from sources other than radio transmitters (RFI) or other communications systems (crosstalk) that is correlated between the common and differential modes. Conventional solutions are suited to target only crosstalk or RFI; not both. Also, the interference sources and their associated coupling transfer functions will, in general, change over time. Known cancellers do not have the ability to adapt to these changing conditions in the presence of the data signal. Furthermore, in a practical implementation, there are complications and difficulties associated with the dynamic range of both the differential-mode and common-mode signals. In implementations in which the multi-carrier communications system is an ADSL or VDSL system, there may be further complications involving interaction of the canceller with On-Line Reconfiguration (OLR), Seamless Rate Adaptation (SRA), and bitswap as defined in the various ADSL and VDSL standards. During such events the transmitted power and/or the constellation size changes for one or more sub-carriers.

BRIEF DESCRIPTION OF THE DRAWINGS

The present invention is illustrated by way of example, and not by way of limitation, in the figures of the accompanying drawings.

DETAILED DESCRIPTION

In the following description, numerous specific details are set forth, such as examples of specific commands, named components, connections, number of frames, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the scope of the present invention.

Some portions of the description that follow are presented in terms of algorithms and symbolic representations of operations on data that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

The following detailed description includes several modules, which will be described below. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software.

Embodiments of a method and apparatus are described to cancel interference in a multi-carrier communications system. In one embodiment, a data signal and a reference signal are received at a receiver. The reference signal is obtained by measuring a common-mode or differential-mode voltage. A block aligner is used to align data blocks in the data and reference signals to increase cross-correlation between the data signal and the reference signal as compared to the unaligned data and reference signals. The aligned time-domain signals are transformed to the frequency-domain where interference cancellation occurs. A tone-by-tone canceller includes a decision feedback mechanism to adapt the canceller under changing conditions in the presence of the data signal in the frequency-domain.

Figure 1:
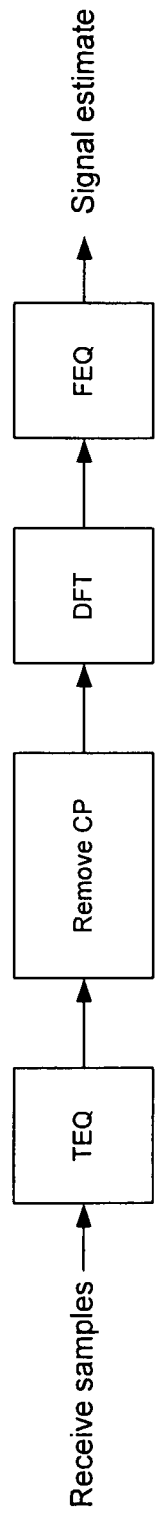
FIG. 1 is a block diagram illustrating a conventional DMT receiver.
Figure 2:
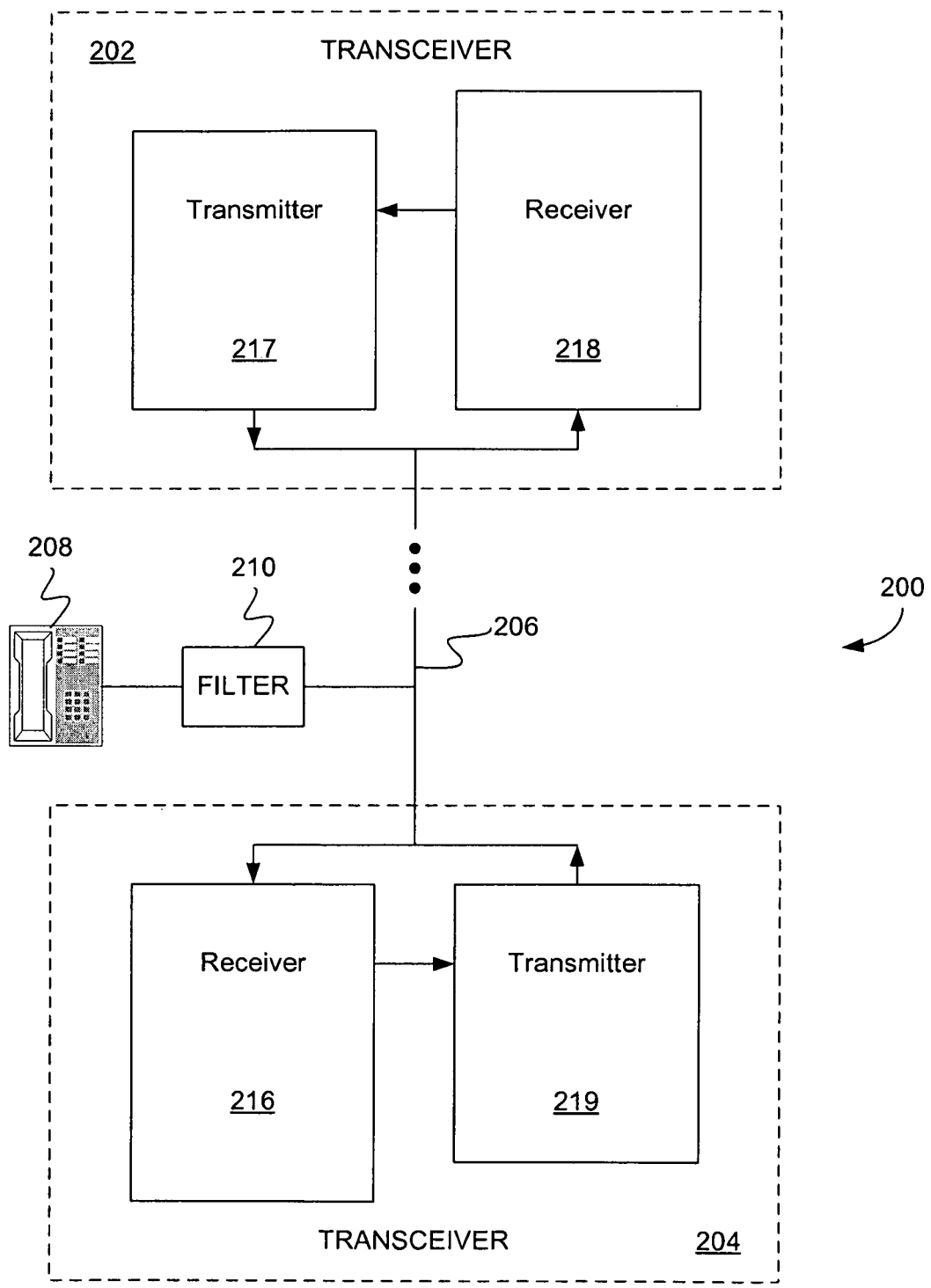
FIG. 2 is a block diagram illustrating an embodiment of a discrete multi-tone system.

FIG. 2 is a block diagram illustrating an embodiment of a discrete multi-tone system. The discrete multi-tone system 200, such as a Digital Subscriber Line (DSL) based network, may have two or more transceivers 202 and 204, such as a DSL modem in a set top box. In one embodiment, the set top box may be a stand-alone DSL modem. In one embodiment, for example, the set top box employs a DSL modem along with other media components to combine television (Internet Protocol TV or satellite) with broadband content from the Internet to bring the airwaves and the Internet to an end user's TV set. Multiple carrier communication channels may communicate a signal to a residential home. The home may have a home network, such as an Ethernet. The home network may either use the multiple carrier communication signal directly, or convert the data from the multiple carrier communication signal. The set top box may also include, for example, an integrated Satellite and Digital Television Receiver, High-Definition Digital Video Recorder, Digital Media Server and other components.

The first transceiver 202, such as a Discrete Multi-Tone transmitter, transmits and receives communication signals from the second transceiver 204 over a transmission medium 206, such as a telephone line. Other devices such as telephone 208 may also connect to this transmission medium 206. An isolating filter 210 generally exists between the telephone 208 and the transmission medium 206. A training period occurs when initially establishing communications between the first transceiver 202 and a second transceiver 204.

The discrete multi-tone system 200 may include a central office, multiple distribution points, and multiple end users. The central office may contain the first transceiver 202 that communicates with the second transceiver 204 at an end user's location.

Each transmitter portion 217, 219 of the transceivers 202, 204, respectively, may transmit data over a number of mutually independent sub-channels i.e., tones. In a DMT communication system, data samples on each tone are represented as one of a set of finite number of points in a two-dimensional (2D) Quadrature Amplitude Modulation (QAM) constellation. The transmitted data in a multi-carrier system is usually represented by a point from a constellation of a finite set of possible data points, regularly distributed over a two dimensional space. Each sub-channel carries only a certain portion of data through QAM of the sub-carrier. The number of information bits loaded on each tone and the size of corresponding QAM constellation may potentially vary from one tone to another and depend generally on the relative power of signal and noise at the receiver. When the characteristics of signal and noise are known for all tones, a bit-loading algorithm may determine the optimal distribution of data bits and signal power amongst sub-channels. Thus, a transmitter portion 217, 219 of the transceivers 202, 204 modulates each sub-carrier with a data point in a QAM constellation.

It should be noted that embodiments of the present invention are described below in reference to receiver 316, which represents one embodiment of receiver 216, for ease of discussion, and that receiver 218 may operate in a similar manner as described below for receiver 316.

Figure 3:
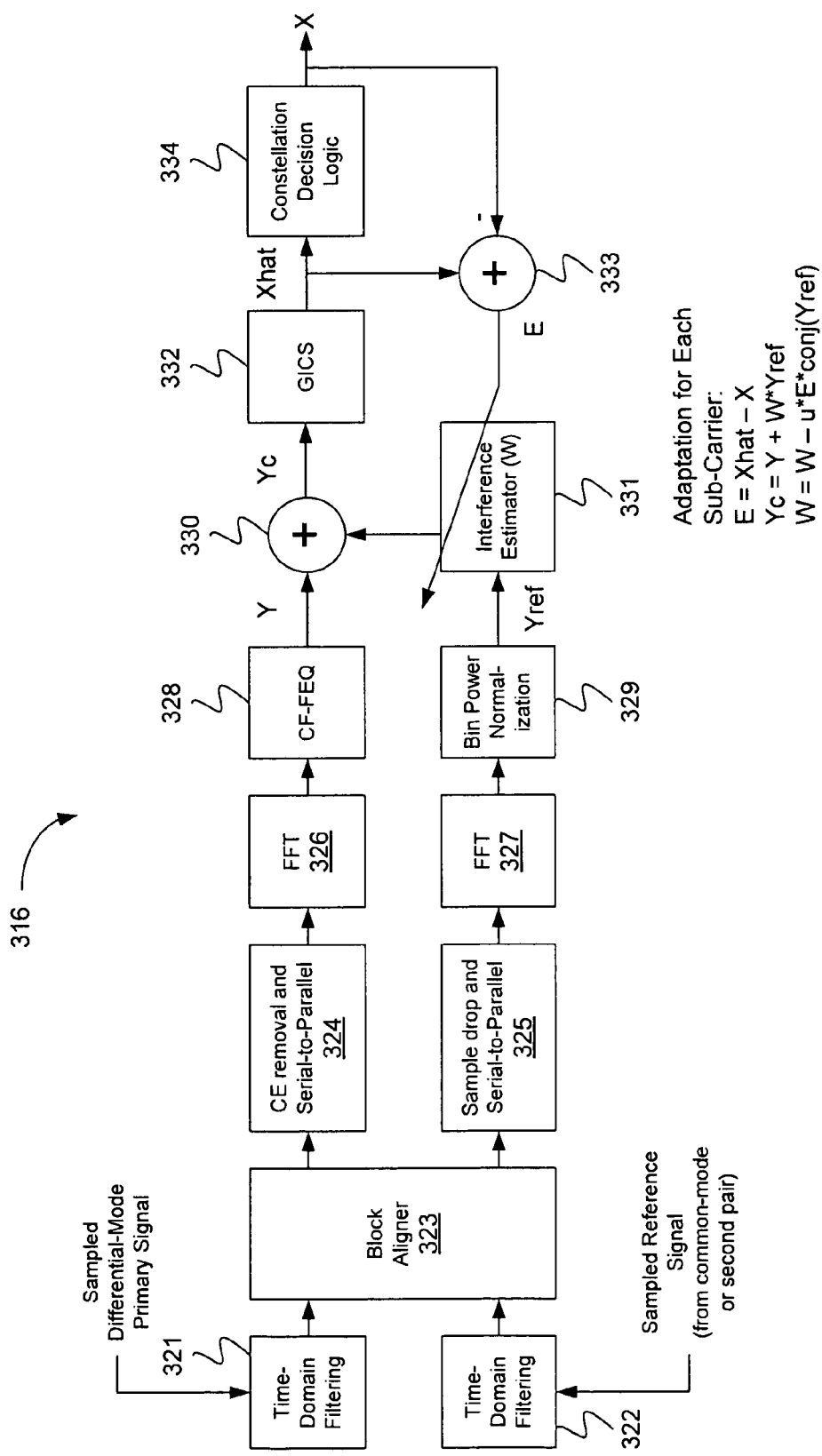
FIG. 3 is a block diagram illustrating one embodiment of a receiver having an adaptive frequency-domain reference noise canceller.

FIG. 3 is a block diagram illustrating one embodiment of a receiver having an adaptive frequency-domain reference noise canceller. In this embodiment, receiver 316 includes time domain filtering modules 321, 322, block aligner 323, cyclic extension (CE) removal and serial-to-parallel module 324, sample drop and serial-to-parallel module 325, fast Fourier transform (FFT) modules 326, 327, channel flattening frequency-domain equalizer (CF-FEQ) module 328, bin power normalization module 329, adders 330, 333, interference estimator module 331, gain inversion and constellation scaling (GICS) module 332, and constellation decision logic module 334. Additional modules and functionality may exist in the receiver 316 that are not illustrated so as not to obscure an understanding of embodiments of the present invention. It should be noted that the operations of one or more modules may be incorporated into or integrated with other modules.

In one embodiment, receiver 316 is implemented in a DMT communications system operating over a twisted-pair communications channel. N is a variable representing the number of tones used in the multi-carrier communication receiver. The communications system may operate in the presence of RFI, crosstalk and other interference. In this embodiment, received samples of a differential-mode primary data signal sent over the twisted pair are provided to a first time-domain filtering module 321. Additionally, a sampled reference signal is received and provided to a second time-domain filtering module 322. The reference signal is obtained by sampling the common-mode signal of the same twisted-pair as the primary data signal. In an alternative embodiment, the reference signal is obtained by sampling the differential mode interference from a second twisted-pair that is not used for data transmission. In another alternative embodiment, the primary data signal is obtained by sampling the differential voltage of a copper pair in a twisted copper quad and the reference signal is obtained by sampling the differential-mode interference from the other two wires of the twisted quad.

In this embodiment, receiver 316 is configured to operate independently of the source of the reference signal. A data signal and a reference signal are received and undergo digital time-domain filtering at modules 321 and 322 respectively. Receiver 316 further includes a block aligner module 323. Block aligner module 323 adjusts the relative alignment of the 2N-sample blocks of the primary data signal and the reference signal as needed. The block aligner module 323 may be implemented with sample-dropping capability, by programming delay First in, First out (FIFO) buffers, or by adjusting the group delay of programmable finite impulse response (FIR) filters. The block aligner module 323 aligns the blocks such that the cross correlation of the reference signal and the primary line interference signal is increased as compared to the cross correlation of the unaligned data and reference signals. For example, the increase in cross-correlation may be in a range of approximately 50 percent to over an order of magnitude. In one embodiment, the blocks are aligned such that the cross-correlation is maximized. Block aligner module 323 will be described further below, with respect to FIG. 8.

A first output of block aligner module 323 provides the aligned data signal to cyclic extension (CE) removal and serial-to-parallel module 324. A second output of block aligner module 323 provides the aligned reference signal to sample drop and serial-to-parallel module 325. Modules 324 and 325 serve to remove samples corresponding to any cyclic extension that may have been added to the data stream at the transmitter as well as convert the serial sample stream in to chunks which may be operated on in parallel.

The data signal and reference signal undergo 2N-point discrete Fourier transforms (DFT). In this embodiment, the DFT is computed efficiently by means of a fast Fourier transform (FFT) at FFT modules 326 and 327. The time-domain samples of both the data signal and the reference signal are provided to FFT modules 326 and 327 which convert the samples into frequency-domain symbols to be used by the canceller. The output of FFT module 326 for the data signal is sent to a channel flattening frequency-domain equalizer (CF-FEQ) module 328. The CF-FEQ module normalizes the phase and power on each frequency bin of the data signal. In a traditional DMT system, at the output of the FFT, each frequency bin of the data signal undergoes an FEQ multiply that inverts the channel attenuation and phase rotation, inverts the fine gain adjustment value assigned to the bin, and adjusts for the constellation size. The result is such that the FEQ output is scaled to an integer grid for decoding. In this embodiment of the present invention, the traditional FEQ is split into a CF-FEQ module 328 and a gain inversion and constellation scaling (GICS) module 332. The two stage approach allows the data signal from the output of FFT module 326 to be normalized for computationally efficient removal of interference using integer arithmetic. It also decouples on-line reconfiguration (OLR), seamless rate adaptation (SRA) and bitswap from the reference noise canceller. That is, the reference noise canceller taps do not need to change during or after such an event.

The output of FFT module 327 for the reference signal undergoes a scaling stage in which the power on each frequency bin of the reference signal is normalized. The bin-power normalization module 329 receives the output of FFT module 327 and corrects amplitude and phase distortion in the reference signal. The bin-power normalization module 329 produces a normalized reference channel output signal Yref.

The normalized reference channel output signal Yref is provided to an interference estimator module 331. Interference estimator module 331 multiplies the reference signal Yref by a single complex tap for each frequency bin thus forming an estimate of the interference in the differential-mode signal for each bin. This estimate is subtracted from the normalized primary channel output signal Y provided by the CF-FEQ module 328. The subtraction is performed by adder 330 and results in a canceller output signal Yc. The canceller output signal Yc is provided to an input of the GICS module 332.

GICS module 332 adjusts the signal for per-bin gain and constellation size. The GICS module 332 produces an output signal Xhat which is provided to an input of a constellation decision logic module 334. In the constellation decision logic module 334, the signal Xhat undergoes constellation decoding where constellation decisions are formed. The constellation decision logic module 334 may include a trellis decoder or a simple un-coded constellation decoder or slicer. Constellation decision logic module 334 produces a constellation decision signal X. The constellation decision signal X is subtracted from the GICS module output signal Xhat to form a decision error estimate E. The subtraction is performed by adder 333. The decision error estimate E is used to adaptively update the canceller taps in the interference estimator module 331. In one embodiment, a least-mean-square (LMS) algorithm is used to update the taps. In alternative embodiments, other algorithms may be used to update the taps such as a recursive least square (RLS) algorithm, a gradient computation, or other algorithm. The structure of receiver 316 allows the canceller to adapt under changing conditions, such as interference sources and their associated coupling transfer functions, and effectively cancel interference in the presence of the actual data signal.

Figure 4:
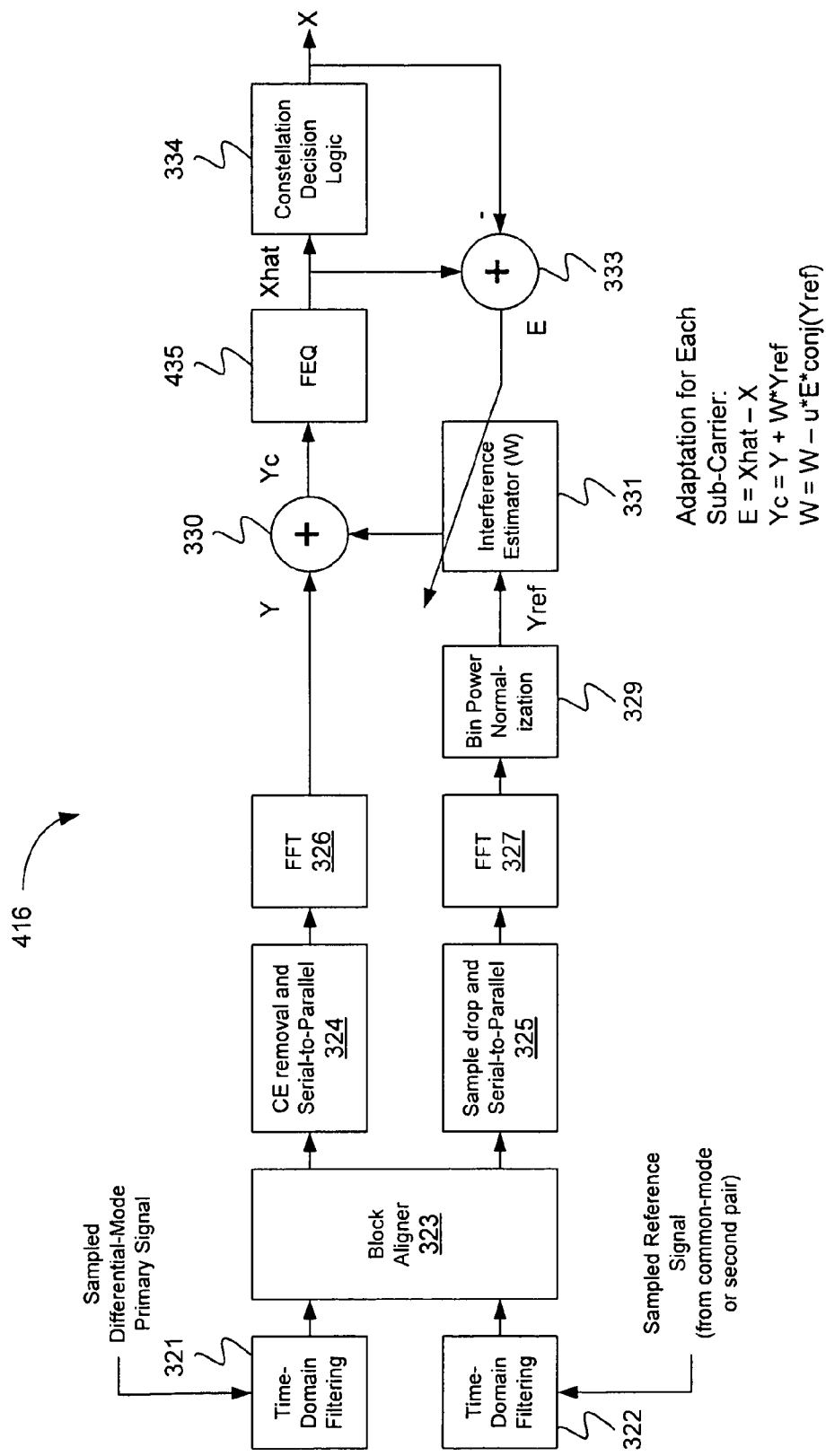
FIG. 4 is a block diagram illustrating an alternative embodiment of a receiver having an adaptive frequency-domain reference noise canceller.

FIG. 4 is a block diagram illustrating an alternative embodiment of a receiver 416 having an adaptive frequency-domain reference noise canceller. In this embodiment, the CF-FEQ module 328 of FIG. 3 is removed and the GICS module 332 of FIG. 3 is replaced with FEQ module 435. FEQ module 435 receives the canceller output signal Yc at an input and provides the decoder input signal Xhat to constellation decision logic module 334. The canceller output signal Yc is obtained by subtracting the interference estimate directly from the primary channel output Y of FFT module 326. The reference signal is processed in the same manner as described above with respect to FIG. 3.

Figure 5:
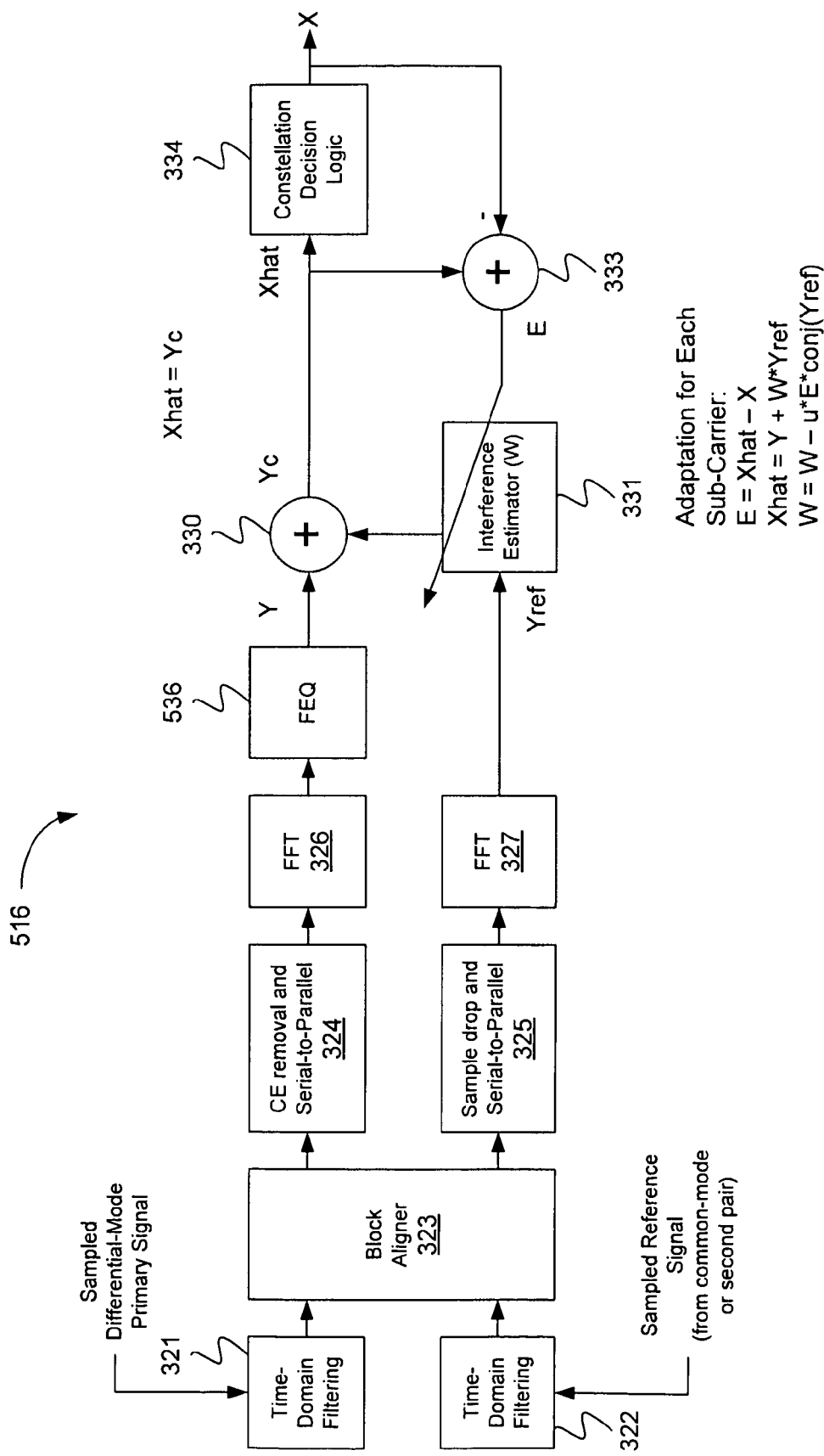
FIG. 5 is a block diagram illustrating a second alternative embodiment of a receiver having an adaptive frequency-domain reference noise canceller.

FIG. 5 is a block diagram illustrating a second alternative embodiment of a receiver having an adaptive frequency-domain reference noise canceller. In this embodiment, the CF-FEQ module 328 of FIG. 3 is replaced with FEQ module 536 and GICS module 332 of FIG. 3 is removed. FEQ module 536 receives the output of FFT module 326 at an input and provides an FEQ output signal Y to adder 330. Bin power normalization module 329 of FIG. 3 has also been removed in this embodiment. The reference channel output Yref of the FFT module 327 is directly multiplied by a single complex tap to form an interference estimate at interference estimator module 331. The interference estimate is subtracted from the FEQ output signal Y at adder 330 and the canceller output Y is provided directly to the constellation decision logic module 334.

Figure 6:
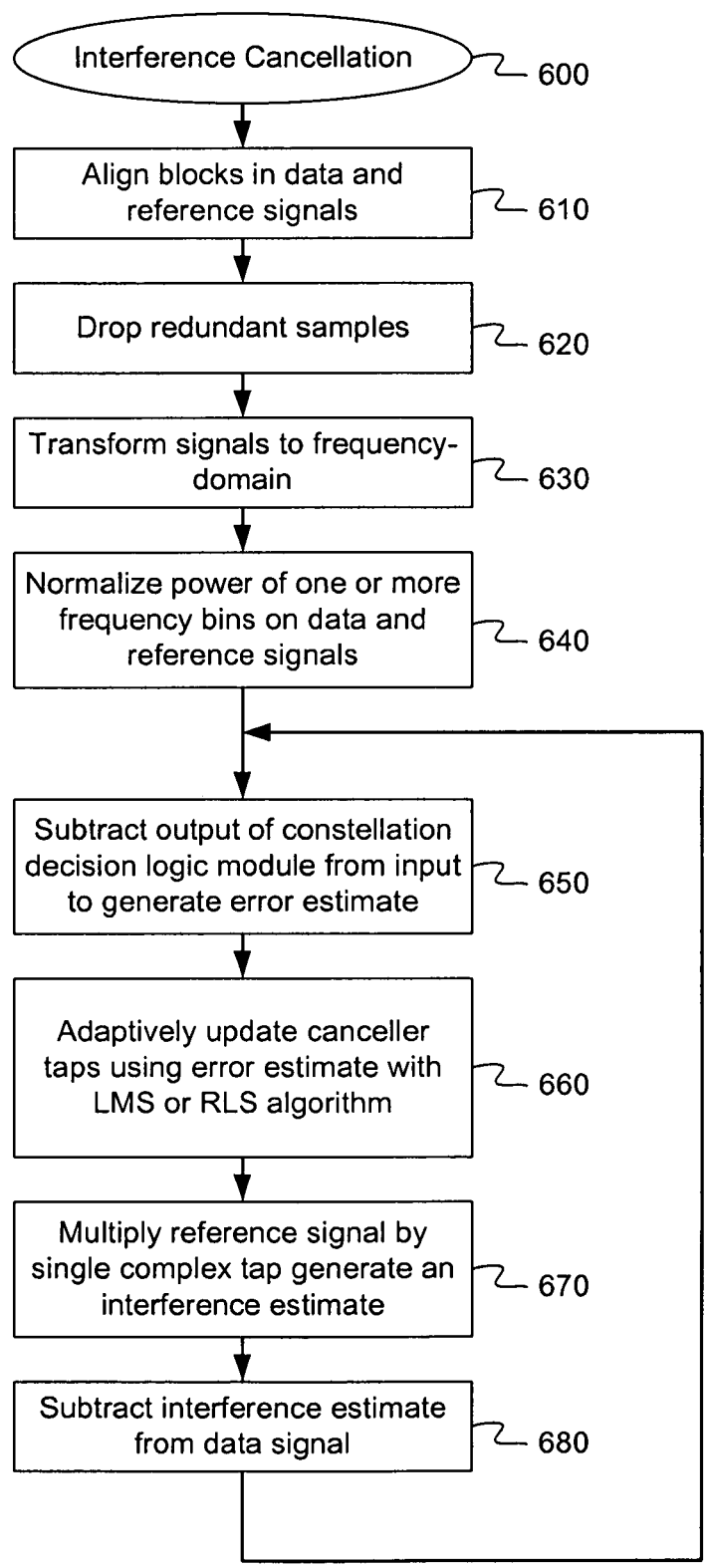
FIG. 6 is a flow chart illustrating one embodiment of an interference cancellation method.

FIG. 6 is a flow chart illustrating one embodiment of an interference cancellation method 600. The process 600 may be performed by processing logic that comprises hardware, firmware, software, or a combination thereof. In one embodiment, process 600 is performed by the receiver 316 of FIG. 3.

Referring to FIG. 6, interference cancellation method 600 reduces the interference in a data signal in a multi-carrier communications system. At block 610, method 600 aligns data blocks from a received data signal and a reference signal to increase cross correlation between the data signal and the reference signal as compared to the unaligned data and reference signals. The block alignment process will be discussed further below with respect to FIG. 7.

At block 620, method 600 drops unneeded samples corresponding to the cyclic extension of the data signal from the aligned data and reference signals. Method 600 also removes any cyclic extension that may have been added to the data stream at the transmitter as well as converts the serial sample stream in to chunks which may be operated on in parallel. At block 630, method 600 transforms the data and reference signals from the time-domain to the frequency-domain. The transformation may be accomplished with the use of a discrete Fourier transform (DFT). In one embodiment, the DFT is performed by FFT modules 326 and 327 of FIG. 3.

At block 640, method 600 normalizes the power on each frequency bin of the data and reference signals. Method 600 corrects any amplitude and phase distortion in the signal to enable efficient noise cancellation. At block 650, the data signal undergoes a constellation decision logic stage where constellation decisions are formed. The output of the constellation decision logic is subtracted from the input to form an error estimate. The error estimate is used to adaptively update canceller taps at block 660. In one embodiment, a least-mean-square (LMS) algorithm is used to update the taps. In alternative embodiments, other algorithms may be used to update the taps such as a recursive least square (RLS) algorithm, a gradient computation, or other algorithm.

At block 670, method 600 multiplies the transformed reference signal by a single complex tap for each of one or more frequency bins of the reference signal. The multiplication results in an estimate of the interference in the data signal. At block 680, method 600 subtracts the interference estimate from the data signal. The subtraction results in a canceller output signal which is then applied to an input the constellation decision logic and method 600 continues at block 650 with the new input. In this manner, method 600 is able to adaptively update the interference canceller with an interference estimate to cancel changing sources of interference during data transmission.

Figure 7:
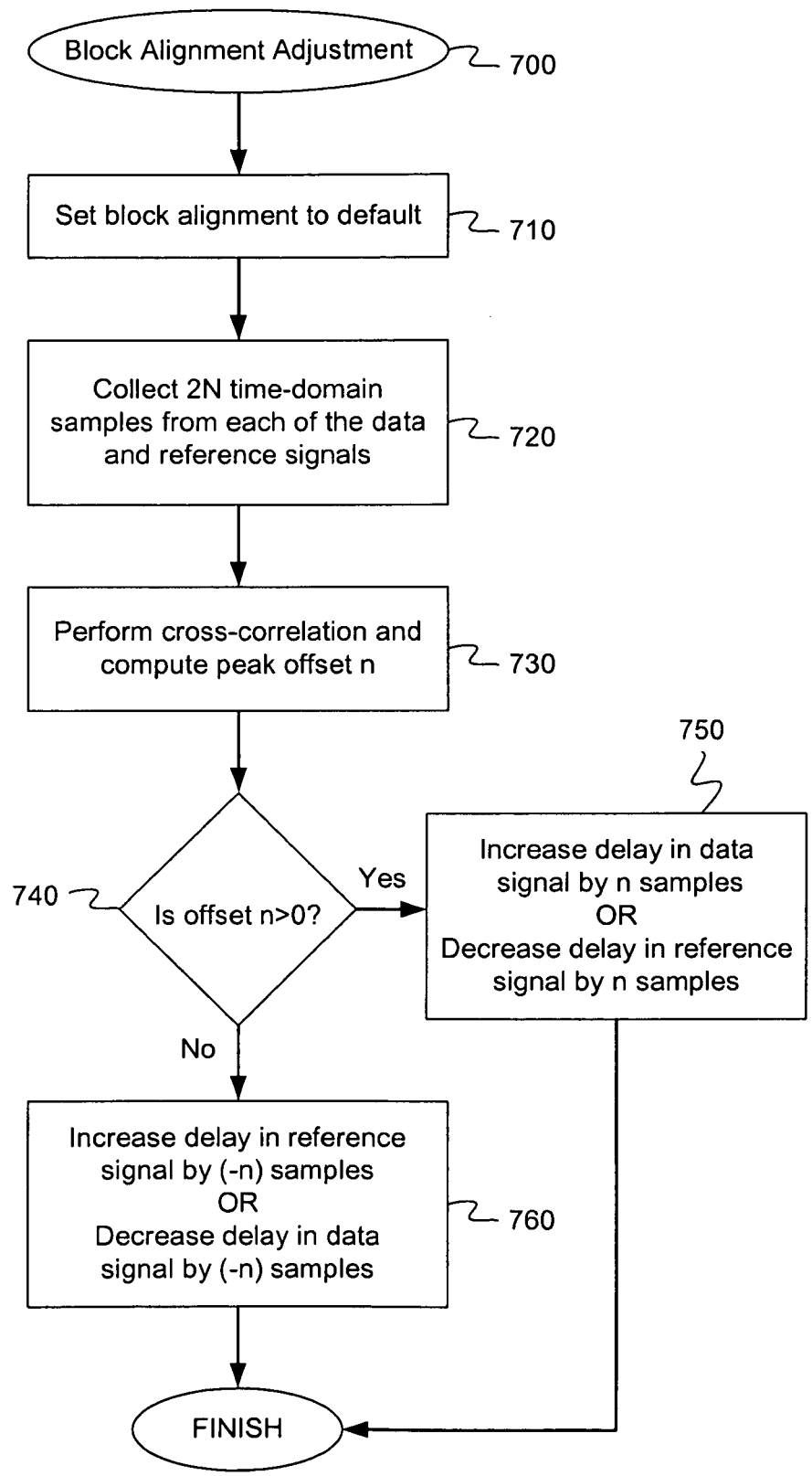
FIG. 7 is a flow chart illustrating one embodiment of a block alignment adjustment method.

FIG. 7 is a flow chart illustrating one embodiment of a block alignment adjustment method 700. The process 700 may be performed by processing logic that comprises hardware, firmware, software, or a combination thereof. In one embodiment, process 700 is performed by the block aligner 323 of FIG. 3.

Referring to FIG. 7, block alignment adjustment method 700 enables alignment of data blocks from at least a received data signal and a reference signal to increase cross correlation between the data signal and the reference signal as compared to the unaligned data and reference signals. Alignment of the data blocks allows for the canceller to achieve optimal noise cancellation. At block 710, method 700 sets the block alignment to a default value. In one embodiment, the default value may be zero offset in both the data signal and the reference signal.

At block 720, method 700 collects 2N time-domain samples from each of the time domain signal and the reference signal. In one embodiment, the collection of each of the two sets of 2N samples begins at the same absolute time. This results in the 2N-sample blocks of the data signal and reference signal being roughly-aligned.

At block 730, method 700 performs cross-correlation of the data and reference signals and computes a peak offset value. Block alignment fine tuning is performed by using the cross-correlation of the interference on the data and reference signals. The measurement occurs when the data signal is not present, such as before modem training commences or at a time during modem training when the far-end transmitter is quiet. After dual 2N-sample blocks are captured at block 720, the cross correlation is computed as $$(y * y_{ref})[n] = \sum_{j} y[j] * y_{ref} * [n + j] \qquad (1)$$

where y is a block of 2N samples from the data signal in the time-domain during a quiet period, $y_{ref}$ is the corresponding block of 2N samples from the reference signal in the time-domain during the same time period, n is the peak offset between the data and reference signals and j is a counting index. The offset is found by determining the values of n for which the cross correlation $(y*y_{ref})[n]$ is greater than when there is no offset (i.e. n=0). In one embodiment method 700 may determine the value of n for which the cross correlation is a maximum. A range of values for n may result in increased cross correlation, however as the values become nearer the value which results in maximum cross-correlation, the efficiency of the interference cancelling increases. Method 700 selects one value of n to use as the offset in the block aligner.

At block 740, method 700 makes a determination as to whether the selected value of n is greater or less than zero. If n is greater than zero, method 700 proceeds to block 750. At block 750, method 700 adjusts the block alignment by the offset n samples. In one embodiment, method 700 increases the delay in the data signal by n samples and in an alternative embodiment, method 700 decreases the delay in the reference signal by n samples. If n is less than zero, method 700 proceeds to block 760. At block 760, method 700 adjusts the block alignment by the offset, n samples. In one embodiment, method 700 increases the delay in the reference signal by (−n) samples and in an alternative embodiment, method 700 decreases the delay in the data signal by (−n) samples. After the block alignment has been adjusted at either block 750 or 760, method 600 ends.

Figure 8:
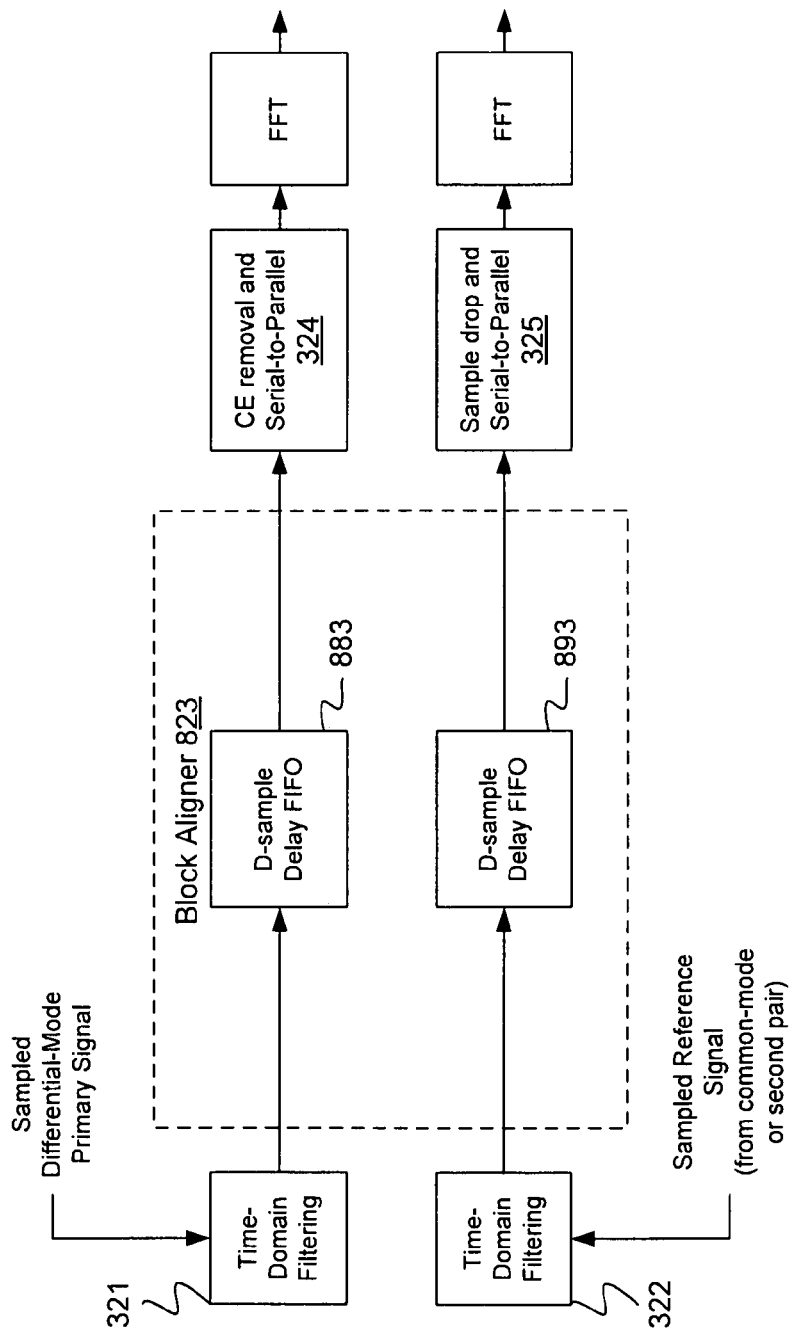
FIG. 8 is a block diagram illustrating one embodiment of a block aligner.

FIG. 8 is a block diagram illustrating one embodiment of a block aligner 823. The block aligner 823 includes two D-sample delay FIFO buffers 883, 893. A first FIFO buffer 883 is in the primary data signal path and a second FIFO buffer 893 is in the reference signal path. If the delay through both time-domain filtering blocks 321, 322 is equivalent, and the Serial-to-Parallel blocks 324, 325 are synchronized such that sample collection for each block begins at the same time on both channels, then the block aligner 823 in this form allows for a plus or minus D-sample fine-tuning delay adjustment between the primary and reference paths. In an alternative embodiment, finite impulse response (FIR) filters are used in place of FIFO buffers 883, 893. Block aligner 823 aligns the blocks of the data and reference signals such that there is an increase in the cross-correlation between the data signal and the reference signal as compared to the unaligned data and reference signals.

In one embodiment, the methods described above may be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, or any type of media suitable for storing electronic instructions. The information representing the apparatuses and/or methods stored on the machine-readable medium may be used in the process of creating the apparatuses and/or methods described herein.

While some specific embodiments of the invention have been shown the invention is not to be limited to these embodiments. The invention is to be understood as not limited by the specific embodiments described herein, but only by the scope of the appended claims.

What is claimed is:

1. A method, comprising:
   receiving, by a receiver device, a data signal and a reference signal;
   aligning, by the receiver device, data blocks in the data signal with data blocks in the reference signal to increase cross-correlation between an aligned data signal and an aligned reference signal as compared to cross-correlation between the data signal and the reference signal; and
   cancelling, by the receiver device and in a frequency domain, interference in the aligned data signal.

2. The method of claim 1, wherein aligning the data blocks in the data signal with the data blocks in the reference signal comprises:
   introducing a first delay into the data signal; and
   introducing a second delay into the reference signal.

3. The method of claim 2, wherein introducing the first delay comprises:
   programming a first programmable delay First in, First out (FIFO) buffer, and wherein introducing the second delay comprises:
   programming a second programmable delay FIFO buffer.

4. The method of claim 2, wherein introducing the first delay and the second delay comprises:
   adjusting a group delay of a first programmable finite impulse response (FIR) filter and a second programmable FIR filter.

5. The method of claim 3, further comprising:
   generating an interference estimate by multiplying the aligned reference signal by a single complex tap for each of one or more frequency bins of the reference signal; and
   subtracting the interference estimate from the aligned data signal.

6. An apparatus, comprising:
   a block aligner configured to align data blocks in a data signal received from a data line with data blocks in a reference signal received from a reference line to increase cross-correlation between the data signal and the reference signal as compared to unaligned data and reference signals; and
   a tone-by-tone canceller configured to cancel, in a frequency domain, interference in the aligned data signal.

7. The apparatus of claim 6, wherein the block aligner comprises:
   a first delay module configured to introduce a first delay into the data signal; and
   a second delay module configured to introduce a second delay into the reference signal.

8. The apparatus of claim 7, wherein the first and second delay modules comprise:
   a programmable delay First in, First out (FIFO) buffer.

9. The apparatus of claim 7, wherein the first and second delay modules comprise:
   a programmable finite impulse response (FIR) filter.

10. A method, comprising:
    generating an interference estimate for a data signal;
    adaptively updating an interference canceller with the interference estimate; and
    aligning blocks of the data signal with blocks of a reference signal to increase cross-correlation between an aligned data signal and an aligned reference signal as compared to cross-correlation between the data signal and the reference signal.

11. The method of claim 10, wherein generating the interference estimate comprises:
    generating an error estimate from the aligned data signal;
    adaptively updating canceller taps with the error estimate; and
    multiplying the aligned reference signal by a single complex canceller tap for each of one or more frequency bins of the reference signal.

12. The method of claim 11, wherein generating the error estimate comprises:
    subtracting an output of a constellation decision logic module from an input of the constellation decision logic module.

13. The method of claim 11, wherein adaptively updating the canceller taps comprises:
    using the error estimate in a least-mean-square algorithm.

14. The method of claim 11, wherein adaptively updating the canceller taps comprises:
    using the error estimate in a recursive least square algorithm.

15. The method of claim 10, wherein adaptively, updating the interference canceller comprises:
    subtracting the interference estimate from the aligned data signal.

16. An apparatus, comprising:
    a block aligner configured to align data blocks in a data signal and data blocks in a reference signal to increase cross-correlation between an aligned data signal and an aligned reference signal as compared to cross-correlation between the data signal and the reference signal; and
    a tone-by-tone canceller operating in a frequency domain, configured to reduce interference in the aligned data signal, the tone-by-tone canceller comprising:
    a constellation decision logic module configured to perform constellation decoding,
    a first adder configured to subtract an output of the constellation decision logic module from an input of the constellation decision logic module to form an error estimate,
    an interference estimator module configured to estimate interference in the aligned reference signal based upon the error estimate to provide an interference estimate, and
    a second adder configured to subtract the interference estimate from the aligned data signal.

17. The apparatus of claim 16, wherein the constellation decision logic module comprises:
    a trellis decoder.

18. The apparatus of claim 16, wherein the constellation decision logic module comprises:
    an un-coded constellation decoder.

19. A method, comprising:
    aligning blocks of a data signal with blocks of a reference signal to increase cross-correlation between an aligned data signal and an aligned reference signal as compared to cross-correlation between the data signal and the reference signal; and cancelling, using a tone-by-tone cancelling device and in a frequency domain, interference in the aligned data signal.

20. The method of claim 19, further comprising:
dropping unneeded samples corresponding to a cyclic extension of the data signal from the aligned data signal and the aligned reference signal.

21. The method of claim 20, further comprising:
transforming the aligned data signal and the aligned reference signal from a representation in a time domain to a representation in the frequency domain.

22. The method of claim 21, further comprising:
normalizing a power of one or more frequency bins of the transformed data signal and the transformed reference signal.

23. The method of claim 22, further comprising:
generating an interference estimate by multiplying the transformed reference signal by a single complex tap for each of the one or more frequency bins of the reference signal.

24. The method of claim 23, wherein cancelling the interference in the aligned data signal comprises subtracting the interference estimate from the transformed data signal.

25. An apparatus, comprising:
a block aligner configured to align data blocks in a data signal and data blocks in a reference signal to increase cross-correlation between an aligned data signal and an aligned reference signal as compared to cross-correlation between the data signal and the reference signal; and
a tone-by-tone canceller, operating in a frequency domain, configured to cancel interference in the aligned data signal.

26. The apparatus of claim 25, wherein the block aligner comprises:
a first delay module configured to introduce a first delay into the data signal; and
a second delay module configured to introduce a second delay into the reference signal.

27. The apparatus of claim 26, wherein the tone-by-tone canceller comprises:
a constellation decision logic module configured to perform constellation decoding;
a first adder configured to subtract an output of the constellation decision logic module from an input of the constellation decision logic module to form an error estimate;
an interference estimator module configured to estimate interference in the aligned reference signal based upon the error estimate to provide an interference estimate; and
a second adder configured to subtract the interference estimate from the data signal.

28. The apparatus of claim 27, further comprising:
a cyclic extension removal and serial-to-parallel module configured to remove a number of redundant samples from the aligned data signal; and
a sample drop and serial-to-parallel module configured to remove a same number of samples from the aligned reference signal as were removed from the aligned data signal.

29. The apparatus of claim 28, further comprising:
a first fast Fourier transform (FFT) module configured to transform the aligned data signal from a representation in a time domain to a representation in the frequency domain; and
a second FFT module configured to transform the aligned reference signal from a second representation in the time domain to a second representation in the frequency domain.

30. The apparatus of claim 29, further comprising:
a channel flattening frequency domain equalizer (CF-FEQ) module configured to receive an output of the first FFT module and provide an output to the second adder;
a gain inversion and constellation scaling (GICS) module configured to receive an output of the second adder; and
a bin power normalization module configured to receive an output of the second FFT module.

31. The apparatus of claim 30, wherein the GICS module is further configured to decouple on-line reconfiguration (OLR), seamless rate adaptation (SRA) and bitswap from the tone-by-tone canceller.

32. An apparatus, comprising:
means for receiving a data signal and a reference signal;
means for aligning data blocks in the data signal with data blocks in the reference signal to maximize cross-correlation between the data signal and the reference signal; and
means for cancelling interference in the data signal in a frequency domain.

33. The apparatus of claim 32, wherein the means for receiving comprises:
means for performing time domain filtering of the data signal and the reference signal.

34. The apparatus of claim 32, further comprising:
means for collecting time domain samples of the data signal and the reference signal.

35. The apparatus of claim 34, further comprising:
means for performing cross-correlation of the data signal and the reference signal and computing a peak offset value of the time domain samples.

36. The apparatus of claim 35, further comprising:
means for introducing a first delay into the data signal and a second delay into the reference signal.

37. The apparatus of claim 36, further comprising:
means for generating an interference estimate for the data signal; and
means for adaptively updating an interference canceller with the interference estimate during data transmission.

* * * * *

UNITED STATES PATENT AND TRADEMARK OFFICE
CERTIFICATE OF CORRECTION

| | | |
|---|---|---|
| PATENT NO. | : 8,605,837 B2 | Page 1 of 1 |
| APPLICATION NO. | : 12/287577 | |
| DATED | : December 10, 2013 | |
| INVENTOR(S) | : Wiese et al. | |

It is certified that error appears in the above-identified patent and that said Letters Patent is hereby corrected as shown below:

On the Title Page Item (56) under "OTHER PUBLICATIONS", please insert the following citations:

--Final Office Action dated May 27, 2010, U.S. Patent Application No. 11/067,434, filed February 25, 2005, Sedarat.
Notice of Allowance dated September 15, 2010, U.S. Patent Application No. 11/067,434, filed February 25, 2005, Sedarat.
Notice of Allowance dated April 29, 2010, U.S. Patent Application No. 11/348,733, filed February 6, 2006, Norrell et al.--

In the Claims

In column 10, lines 30-31, please replace "adaptively, updating the interference canceller" with --adaptively updating the interference canceller--.

Signed and Sealed this
First Day of July, 2014

Michelle K. Lee
*Deputy Director of the United States Patent and Trademark Office*